United States Patent [19]

Briggs, Jr. et al.

[11] 4,360,828
[45] Nov. 23, 1982

[54] HOTEL/MOTEL POWER LOAD CONTROL AND BILATERAL SIGNALLING APPARATUS

[75] Inventors: Robert S. Briggs, Jr.; James W. Porter, both of Richardson, Tex.

[73] Assignee: Spectradyne, Incorporated, Richardson, Tex.

[21] Appl. No.: 931,683

[22] Filed: Aug. 7, 1978

[51] Int. Cl.$^3$ ............................................... H04N 7/10
[52] U.S. Cl. ...................... 358/86; 329/124; 455/3; 455/5
[58] Field of Search ................. 325/31, 308; 358/84, 358/86; 455/2-6; 329/124

[56] References Cited

U.S. PATENT DOCUMENTS

| | | | |
|---|---|---|---|
| 2,917,622 | 12/1959 | Wales, Jr. et al. | 358/84 |
| 3,069,625 | 12/1962 | Morita et al. | 329/124 |
| 3,676,580 | 7/1972 | Beck | 358/84 |
| 3,733,430 | 5/1973 | Thompson et al. | 358/84 |
| 3,752,908 | 8/1973 | Boenke et al. | 455/5 |
| 3,778,716 | 12/1973 | Stokes | 455/5 |
| 3,803,491 | 4/1974 | Osborn | 358/84 |
| 4,213,096 | 2/1980 | Daniel, Jr. | 329/124 |
| 4,245,245 | 1/1981 | Matsumoto et al. | 358/84 |

*Primary Examiner*—Joseph A. Orsino, Jr.
*Attorney, Agent, or Firm*—Stephen B. Judlowe

[57] ABSTRACT

Head end apparatus delivers video signals, e.g., premium and standard television programming to distinct locations such as hotel/motel rooms, an apartment or the like via a common MATV cable. The head end also transmits digital messages to receivers at each room location which are recovered via a phase detector and supplied to predetermined appropriate output utilization apparatus via a multiplexer and microprocessor. Similarly, messages generated at each room are transmitted upstream to the head end via the cable, employing a portion of the phase detector apparatus.

In accordance with varying aspects of the present invention, the bilaterally propagating digital messages may comprise status controls for controlled equipment, e.g., electrical loads; and/or may comprise a data exchange for a communications application. Further, the room transmission apparatus is adapted to fail, if at all, in a noninterfering mode which does not comprise overall system operability.

7 Claims, 3 Drawing Figures

HOTEL/MOTEL POWER LOAD CONTROL AND BILATERAL SIGNALLING APPARATUS

DISCLOSURE OF THE INVENTION

This invention relates to electronic control apparatus and, more specifically, to structure for monitoring and controlling plural electrical loads via a common signalling medium, e.g., a hotel/motel MATV coaxial cable.

It is a general object of the present invention to provide flexible bilateral communications between a head end and plural remote locations, e.g., rooms of a hotel/motel/apartment complex-as via a master antenna television (MATV) video signal distribution cable.

More specifically, it is an object of the present invention to provide master station control over dispersed electrical loads (e.g., air conditioners, heaters and the like located in distinct hotel/motel rooms or apartments).

It is another object of the present invention to provide multiplexed general purpose communications between a head end and signalling equipment in diverse hotel/motel rooms.

The above and other objects of the present invention are realized in a specific, illustrative embodiment thereof wherein a head end delivers video signals, e.g., premium and standard television programming, to distinct locations such as hotel/motel rooms or apartments via a common MATV cable. The head end also transmits digital messages to receivers at each room location which are recovered via a phase detector, and supplied to predetermined appropriate output utilization apparatus via a multiplexer and microprocessor. Similarly, messages generated at each room are transmitted upstream to the head end via the cable, employing a portion of the phase detector apparatus.

In accordance with varying aspects of the present invention, the bilaterally propogating digital messages may be status controls, e.g., for electrical loads, and/or may comprise a data exchange for a communications application. Further, the room transmission apparatus is adapted to fail, if at all, in a no-interfering mode which does not compromise system integrity.

The above and other features of the present invention will become more clear from the following detailed description of a specific illustrative embodiment thereof, presented herein below in conjunction with the accompanying drawing, in which.

Figure 1:
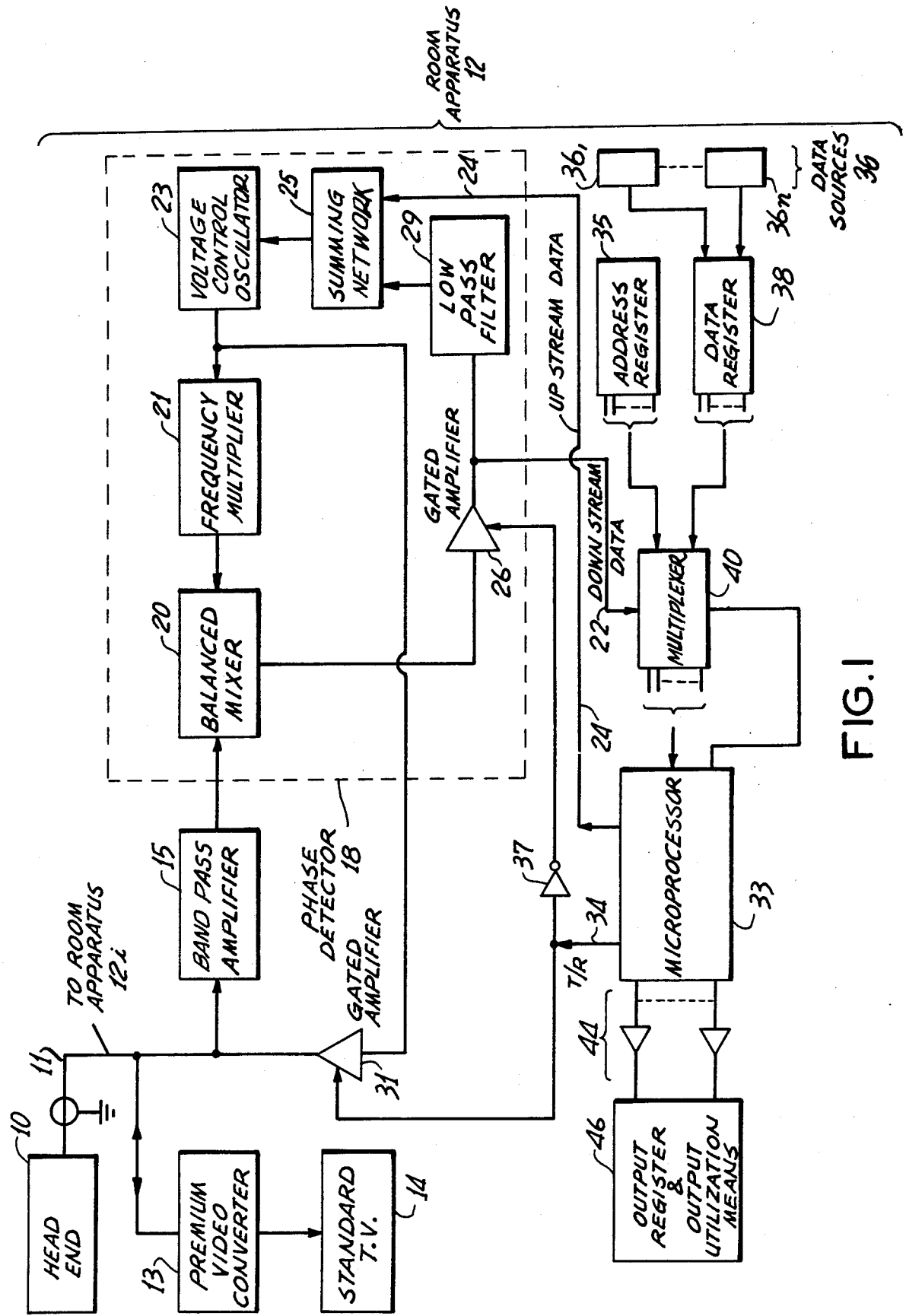
FIG. 1 is a block diagram illustrating bilateral signalling apparatus embodying the principles of the present invention.

Referring now to FIG. 1, there is shown a specific, illustrative bilateral signalling system usable, for example, in a hotel, motel and/or apartment complex or the like to communicate television signals from a head end 10 to a plural subscribed stations (room) apparatus 12, and to permit a bilateral data exchange between the head end 10 and each room apparatus 12. The head end and the rooms 12 are connected as via a common coaxial cable 11 which may typically be the MATV cable already in place in such hotel or analogous environment to distribute video programming from a master antenna and/or other head end video source. For concreteness, and without any loss of generality, it will be assumed that each of room apparatus 12 is that for a hotel. Further with specific regard to FIG. 1, the apparatus associated with one particular room 12 is shown in detail with other plural like such room equipment 12i being shown as similarly connected to the wide band master antenna cable 11.

Treating first the per se existent video signal distribution function, the head end 10 typically impresses on the coaxial cable 11 an ensemble of television programs at radio frequency. In addition, it has become fairly common to supplement the commonly available (e.g. "off-air") video signals with premium programs for which a fee is charged. Such premium programs may comprise such as recently released films, sporting events not available on commercial television, or the like. Such premium programs are transmitted in a form or frequency spectrum which cannot be received by a standard television set 14. Thus, for example, such premium signals have sometimes been transmitted in the midband frequency spacing between the upper bound of Channel 6 and the lower frequency bound of Channel 7 which cannot be received by conventional discretely tuned VHF television sets 14.

To permit reception of such premium television signals, each room is provided with a video frequency converter 13 which converts the frequency spectrum of a selected premium video signal to the VHF frequency band of a standard channel, thus rendering the premium signal receivable by the standard television set 14 located in the room. In one type of system currently in use, the guest requires the purchase of a key to enable the converter 13 to control an electrical switch operated by the key. In another such system, no key or other prior selection is required. To the contrary, equipment in the converter apparatus 13 reports back to the head end 10 via the coaxial cable 11 the identity and channel selection of the particular room apparatus 12 which is watching one of the premium channels. For an example of this latter type of system, see, for example, U.S. Pat. No. 3,944,742 issued Mar. 16, 1976 and assigned to the assignee hereof for a spontaneous, code burst reporting system the disclosure of which is incorporated herein by reference.

Other premium video signalling and billing pay TV systems in hotel and like contexts are similarly well-known per se to those skilled in the art.

It is a further purpose of the apparatus of the instant invention to provide a separate data exchange between the head end 10 and each room apparatus 12. Thus, in one illustrative yet important context, the head end 10 may be employed to send data messages to the room apparatus 12 illustrated in detail in FIG. 1 (and to all others) to control various power loads in the room for energy (and cost) conservation purposes. Thus, for the hotel-motel context, the head end may issue messages to turn electrical loads on or off such as room air conditioners, heaters and the like as guests vacate or lease particular rooms. Such energy control can have an important economic impact in the operation of such a hotel environment. Beyond this, the data exchange between the head end 10 and the illustrative room apparatus 12 may be for any other purpose, e.g., to provide bilateral signalling between a telex or other data terminal located in the room and any cooperating data terminal either at the head end 10 or connected thereto via any communications link, such as a telephone line. Yet further data communication between the room apparatus 12 and the head end 10 may be for security monitoring purposes to monitor and/or control access, maid status, continued presence of equipment, or the like. Again for purposes for concreteness and without limitation, operation of the room apparatus 12 will be presented in conjunction with FIG. 2 to illustrate head end control of an air conditioner load 63, the load 63 being merely illustrative.

For purposes of down stream data transmission, i.e., from the head end 10 to the room apparatus 12 (and to all other rooms) the head end 10 impresses on the coaxial cable 11 at a frequency allocation not interfering with video program distribution and monitoring, a narrow band data channel exhibiting any desired form of modulation, e.g., frequency shift keying (FSK) encoding. The particular message format may comprise a particular unique beginning of message binary group (a "data alert"), followed by an address field which identifies the address or room location for which the down stream message is intended, followed by the data message itself. Alternatively, the data and address digits may be commingled during transmission in a predetermined sequence.

This down stream message passes through a band pass amplifier 15 in the room apparatus 12 (and the apparatus 12 in other rooms as well) which selects and passes to a phase detector 18 only the narrow band data channel. While any phase detector 18, per se well known, may be employed, an especially effective form, for purposes below discussed, comprises a balanced mixer 20 receiving its local oscillator input from a voltage control oscillator 23 increased in frequency by a frequency multiplier 21. The balanced mixer 20 further receiving as an input the modulated data carrier and from the band pass amplifier 15.

In the per se well known fashion, the output of balanced mixer 20 signalling a difference in frequency between the local oscillator frequency output of multiplier 21 and the input supplied thereto by band pass amplifier 15, directly provides a measure of the intelligence, FSK modulated, on the narrow band carrier transmitted from the head end 10. This intelligence bearing signal at the output of mixer 20 is supplied to and through a gated amplifier 26 which is normally enabled by an output 34 of the microprocessor 33 via an inverter 37. That is, during the data receiving portion of an operative cycle, the gated amplifier 26 in the phase detector 18 is operative—while a gated amplifier 31 associated with upstream signal transmission from the room apparatus 12 to the head end 10 is disabled. The down stream modulation intelligence being received is communicated via a lead 22 to a multiplexer 40 and, in a per se conventional manner, to the data input port of the microprocessor 33.

To complete functional operation of the phase detector 18, the output of the gated amplifier 26 passes through a low pass filter 29 and linear summing network 25 to the voltage controlling port of the voltage controlled oscillator 23. The phase detector 18 again performs in the well known manner to automatically control the variable frequency oscillator 23 to operate at the nominal carrier frequency of the FSK modulation signal. The time constant of the low pass 29 is adjusted such that it cannot respond at the data or modulation rate of the transmitted carrier, thus causing the data to be present at the output of balanced mixer 20 and gated amplifier 26 since the output of the frequency multiplier 21 is essentially of constant frequency vis-a-vis the relatively rapid data rate. However, the voltage controlled oscillator 23 does react to any relatively long term changes in carrier frequency (servomechanism action to insure proper data reception notwithstanding carrier frequency drifts at the head end).

During the assumed down stream data transmission from the head end 10 to the room apparatus 12, the transmitted digital data impressed on the coaxial cable 11 by the head end 10 is present on the lead 22 as above discussed and passed in the form of plural digit bytes into storage in the microprocessor 33 via the multiplexer 40 (the term "microprocessor" is used herein in its broader sense to include RAM and ROM storage). Also supplied to the microprocessor 33 via multiplexer 40 is the fixed contents of an address register 35 which is the unique address of the room 12 under consideration. The address register 35 for TTL or other current sinking logic may simply comprise an array of open or short circuits to ground. Also supplied to storage in the microprocessor 33 is the contents of a data register 38 which has stored therein the output of an array of data sources $36_1, \ldots, 36_n$ representing the status of devices in the room being monitored. For a power controlling application, each of the data sources 36 may simply comprise the on-off status of an energy consuming load being monitored as signalled, for example, by relay contacts forming a part of a relay controlling the power device. Also, as further discussed in conjunction with FIG. 2, one or more of the data sources 36 may comprise a plural digit word quantizing a variable of interest, e.g., the output of a room temperature sensing thermostat for air conditioning or heating control.

The down stream information supplied to the microprocessor 33 via phase detector 18, lead 22, and multiplexer 40 is supplied via buffer amplifier 44 to an output register and output utilization means 46. More specifically, the information communicated by microprocessor 33 to output register and output utilization means 46 may directly comprise the data portion of the message transmitted by the head end 10 to the particular room apparatus 12. Thus, for example, the data may be a series of binary "1's" and "0's" which directly translate into on-off control for power relays selectively excited depending upon the state of a corresponding bit in the output register. Alternatively, the microprocessor 33 may operate upon the received data in accordance with any desired algorithm, e.g., to limit total power consumption and eliminate load in accordance with time of day, load hierarchy or the like.

To briefly functionally review here the overall reception mode operation for the subject room 12 apparatus, the equipment above described initially starts in a receive-data-mode under control of a receiver level output signal on lead 34 emanating from the microprocessor 33. When the incoming data stream, as detected at the output lead 22 of phase detector 18, communicates the special data alert field indicating that a message is forthcoming, the several bytes of the data message are loaded into microprocessor storage (RAM or microprocessor internal register). If a comparison of the address portion of the communicated message differs from the unique address of the particular room apparatus 12 as signalled by the fixed content of register 35, the received message is disregarded and the processor 33 returns to a data receive mode looking for the next "data alert" code group signalling the beginning of the next message. Should the message be intended for the particular apparatus 12, the microprocessor 33 notes a match between the address portion of the received message and the contents of register 35. The data portion of the received plural byte message is then outputted to the output register and output utilization means 46—again, either directly or after any desired data manipulation.

Following the data reception operation as above described the particular station 12 addressed then transmits any outgoing information it has to the head end 10. This transmission is signalled by the microprocessor 33 changing the level on control lead 34 from the receiver to the transmit voltage level. This transmit level enables gated band pass amplifier 31 to couple upstream information from the station 12 to the common coaxial cable 11—and also opens (disables) gated amplifier 26 via inverter 37 thereby opening the previously closed feed back loop of the phase detector 18.

During the transmit mode, the microprocessor 33 supplies the information to be transmitted via lead 24 to the summing network 25. The data voltage on lead 24 combines with the output potential from low pass filter 29 during the very brief station 12 data transmission interval to provide an output voltage from network 25 which varies about a center frequency in accordance with the upstream data. This data—modulated control voltage is applied to the frequency control part of the voltage controlled oscillator 23. Accordingly, a variable output frequency (and thus, a frequency shift keyed data modulated carrier) results at the output of oscillator 23 and is coupled to the head end 10 via enable gated amplifier 31 and the coaxial cable 11. Because of the frequency multiplication effected by multiplier 21, the down and upstream messages occupy different, noninterfering frequency bands.

Following the short transmit interval, the microprocessor 33 returns the voltage on control line 34 to the receive level such that the station 12 again examines the downstream data channel for the incidence of the next beginning-of-message data alert code group.

It is observed that the low pass filter 29 is characterized by a time constant which is long vis-a-vis the downstream data rate—but which is short (e.g., a small portion of a second) in the absolute time sense. One difficulty heretofor encountered by prior art pay television systems and the like, wherein plural room apparatus 12 each communicate with a head end 10 via a common cable 11 at a like transmission frequency, is the degradation of system operation caused by a failure of any one of room apparatus 12 in a continuous talking (transmitting) mode. When this occurs, the spurious transmitting apparatus 12 can in the worst case mask upstream communications from all other stations, thus obviating all transmissions to the head end 10. In the apparatus of the instant invention, the short time constant for low pass filter 29 gives rise to an effective direct current output potential from filter 29 which decreases rapidly after gated amplifier 26 (and thereby also the concomitant feedback loop) is open. Accordingly, should the room apparatus 12 fail in a transmit mode, the decaying output potential from low pass filter 29 very rapidly pulls the quiescent output frequency of voltage controlled oscillator 23 out of the upstream receiving range of the head end 10 (and, preferably also, out of the pass band of amplifier 31) such that the failed apparatus 12 does not interfere with communications from any other apparatus 12 that is operating in the proper frequency band for head end reception.

Figure 2:
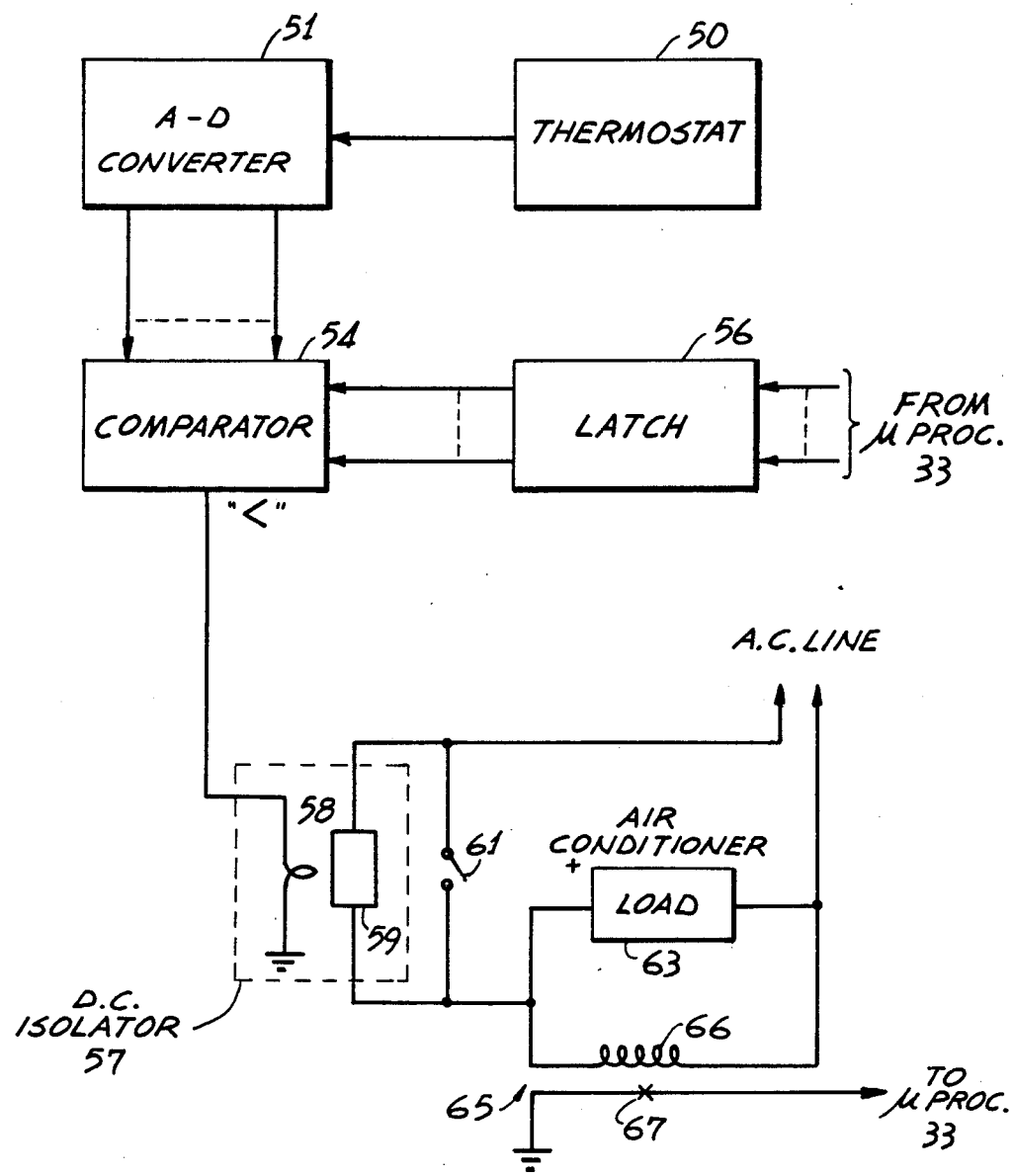
FIG. 2 illustrates illustrative monitoring and control structure for the FIG. 1 apparatus.

Turning now to FIG. 2, there is shown specific illustrative station 12 equipment illustrating one particular manner (if many) in which the microprocessor 33 controls a typical load, e.g., an air conditioner 63. A thermostat 50 located in the room provides its typically output analog voltage signal to an analog-to-digital converter 51, which converts the analog signal to digital form. The digital output of converter 51, signalling the instantly obtaining room temperature is supplied to a digital comparator 54. The output from the microprocessor 33 (as via the buffer amplifiers 44 of FIG. 1) is stored in a register or latch 56 and supplied therefrom to second inputs of the digital comparator 54.

When the desired room temperature, as represented by the contents of latch 56, is less than the presently obtaining temperature, an appropriate output signal is developed at the "less than" comparator output which turns on a DC isolator/switch 57 of any known kind, e.g., formed of a light emitting diode 58 and a bidirectionally conducting light gate-excited semiconductor (triac) or other form of relay. The conductive switch path 59 completes the circuit from an AC line across the load 63 thereby turning on the air conditioner. Further, a relay coil 66 connected in parallel with load 63 closes normally open relay contact 67, thereby providing a ground ("binary 0") indication to the microprocessor 33 for transmission to the head end 10. Thus, for the FIG. 2 arrangement, latch 56 corresponds to the output register of element 46 of FIG. 1; while the contacts 67 comprise one of the data sources 36.

The ordering of FIG. 2, of course, may be reverted. The microprocessor 33 may supply a single binary digit to directly turn the control air conditioner load 63 on or off via a D.C. buffering and power device (e.g., a relay); and the digital output of the thermostat 50, i.e., the output of analog-to-digital converter 51, supplied as a data word (one of the data sources 36) to the microprocessor 33 via multiplexer 40 for transmission to the head end 10. Thus the head end would make the on/off decision rather than the room equipment. Further, in this regard, it is observed that the output utilization means 46 may comprise any electronic, electromechanical or communications device which can communicate in a bilateral manner with the head end 10.

Figure 3:
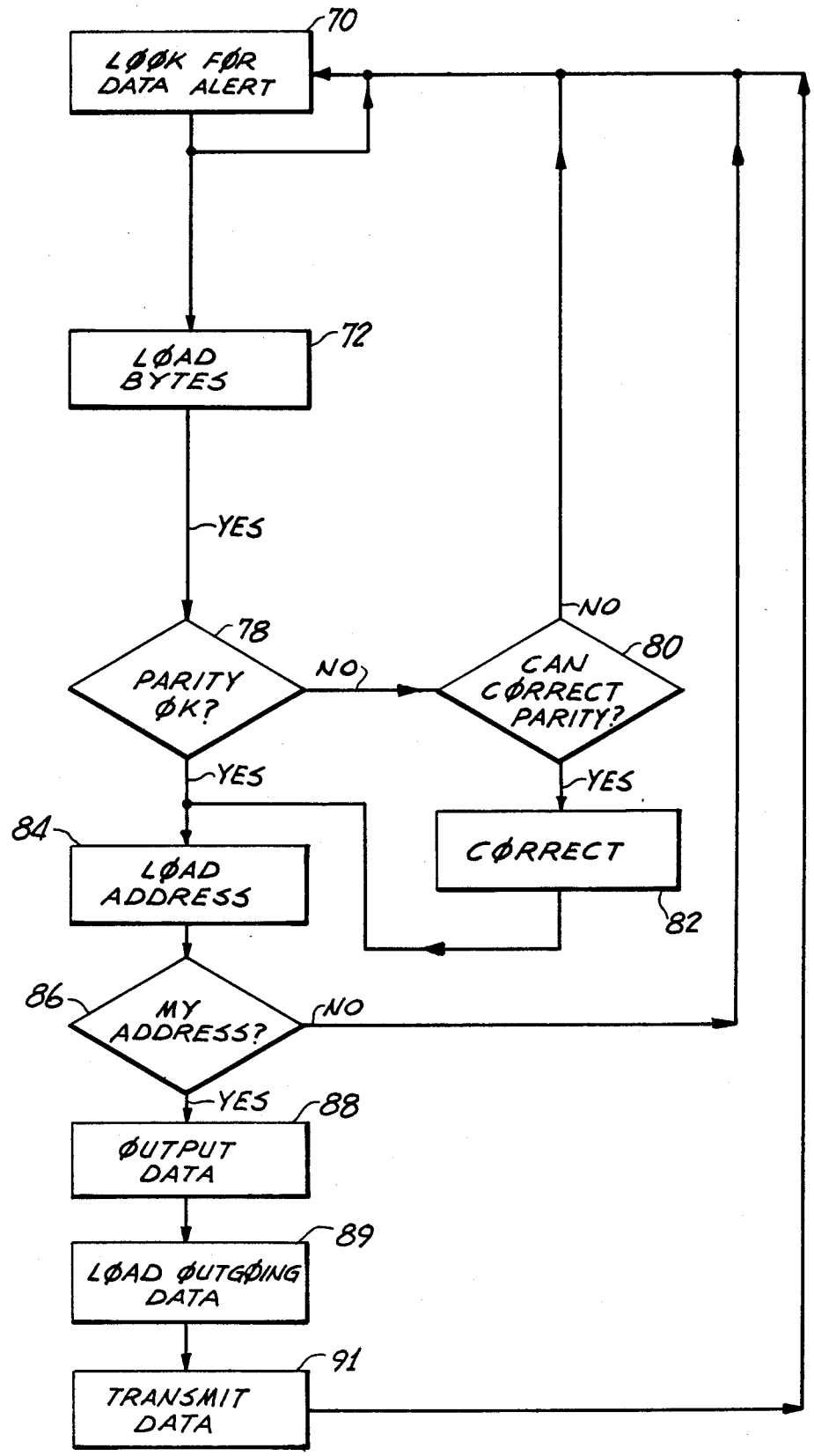
FIG. 3 is a flow chart illustrating operation of a microprocessor 33 employed in the FIG. 1 arrangement.

Turning now to FIG. 3, there is shown a flow chart depicting operation of the microprocessor 33 (and thereby also of the RAM and ROM memories associated therewith). The functioning of the flow chart has already been described above and will not be extensively repeated for purposes of conciseness. In brief, the processor 33 initially receives incoming data looking for the unique beginning-of-message "data alert" code group. This self-looping function ends when a data alert is received (functional block 70), and is followed by a loading of the next following down stream incoming message bytes in RAM storage or in an internal microprocessor 33 register as desired (block 72).

After all the data has been loaded, parity is checked (test 78) and corrected if possible (test 80 and correction functional block 82). This assumes that the transmitted message has a parity encoding with an error correction capability, e.g., such as by using the well known Hamming coding. If the parity check fails and cannot be corrected, operation reverts to state 70 to look for the next beginning-of-message field.

Assuming that the receive message was already proper (parity verifies) or was made so by a correction operation, the address portion of the received message is loaded into a microprocessor register (block 84) and compared against the unique address of the particular room apparatus originally signalled to the microprocessor 33 by the manually fixed contents of address register 35. If there is no address match, indicating that the message is not destined for the specific room 12, address test 86 fails and control reverts to block 70 to look for the next message. Assuming the message was in fact destined for the room 12 (test 86 is affirmative), the incoming down stream data is supplied as output information to the output register and utilization means 46 (functional block 88).

Finally, the information to be transmitted from the room 12 to the head end is loaded by microprocessor 33 (functional block 89) and then transmitted to the head end 10 (block 91) in the manner above described. Finally, microprocessor control again returns to block 70 to begin reviewing the incoming data for the beginning of the next message.

The above described arrangement has thus been shown to efficiently and reliably provide bilateral communications between a head end 10 and each of plural room apparatus 12 via a common distribution cable—as well as accountably providing premium video distribution.

The particular embodiment disclosed in detail herein and discussed above is merely illustrative of the principles of the present invention. Numerous modifications and adaptations thereof will be readily apparent to those skilled in the art without departing from the spirit and scope of the present invention.

What is claimed is:

1. In combination; signal distribution cable means; head end means and plural station means each connected to said cable; each of said head end and station means comprising transmission means and reception means; said transmission means of said head end including means for impressing a data channel on said cable for distribution to said receiving means of said station means; each of said station means including a stored program controlled microprocessor, said reception means of said station means including detector means for receiving said data channel and supplying the information derived therefrom to said microprocessor, each of said transmission means of said station means including means responsive to outgoing data supplied thereto by said microprocessor for supplying said outgoing data to said cable for delivery to said head end, wherein said head end data channel impressing means comprises angle modulation means, and wherein said station receiver detector means comprises a phase detector feedback circuit comprising the series connection of a balanced mixer, low pass filter and variable frequency oscillator controlled by said filter, further comprising means connecting the output of said balanced mixer with a data input of said microprocessor for furnishing received data channel information thereto wherein said phase detector feed back circuit further includes gated means connecting the output signal supplied by said balanced mixer with said low pass filter, and means for selectively disabling said gated means during periods when said station means is transmitting, whereby the low pass filter changes the transmission frequency of said station means to a non-interfering value if said station means fails in a transmitting mode.

2. A combination as in claim 1, further comprising output register and output utilization means connected to said microprocessor.

3. A combination as in claim 1 wherein each of said station means further comprises a premium video converter connected to said signal distribution cable means.

4. A combination as in claim 1, wherein said gated means comprises a gated amplifier.

5. A combination as in claim 1 further comprising output register and output utilization means connected to an output port of said microprocessor, a multiplexer connected to an input port of said microprocessor, and data register and identity register means connected to inputs of said multiplexer.

6. A combination as in claim 5 wherein said output means comprises at least one electrical load, and means for controlling said load dependent upon output information provided by said microprocessor; and wherein said data register includes status reporting means.

7. In combination; signal distribution cable means; head end means and plural station means each connected to said cable; each of said head end and station means comprising transmission means and reception means; said transmission means of said head end including means for impressing a data channel on said cable for distribution to said receiving means of said station means; each of said station means including a stored program controlled microprocessor, said reception means of said station means including detector means for receiving said data channel and supplying the information derived therefrom to said microprocessor, each of said transmission means of said station means including means responsive to outgoing data supplied thereto by said microprocessor for supplying said outgoing data to said cable for delivery to said head end, wherein said head end data channel impressing means comprises angle modulation means, and wherein said station receiver detector means comprises a phase detector feedback circuit comprising the series connection of a balanced mixer, low pass filter and variable frequency oscillator controlled by said filter, further comprising means connecting the output of said balanced mixer with a data input of said microprocessor for furnishing received data channel information thereto further comprising frequency multiplier means connecting said variable frequency oscillator and said balanced mixer wherein said phase detector feed back circuit further includes gated means connecting the output signal supplied by said balanced mixer with said low pass filter, and means for selectively disabling said gated means during periods when said station means is transmitting, whereby the low pass filter changes the transmission frequency of said station means to a non-interfering value if said station means fails in a transmitting mode.

* * * * *